United States Patent

[11] 3,549,957

| [72] | Inventors | Joseph L. Weininger;<br>William N. Carson, Jr., Schenectady, N.Y. |
|---|---|---|
| [21] | Appl. No. | 801,515 |
| [22] | Filed | Feb. 24, 1969 |
| [45] | Patented | Dec. 22, 1970 |
| [73] | Assignee | General Electric Company<br>a corporation of New York<br>Continuation-in-part of application Ser. No.<br>748508, July 29, 1968, now abandoned. |

[54] ELECTROCHEMICAL CELL WITH ELECTRON EXCHANGE MEMBRANE BETWEEN SOLUTIONS IN COMPARTMENTS
5 Claims, 1 Drawing Fig.

| [52] | U.S. Cl. | 317/231, 320/48 |
|---|---|---|
| [51] | Int. Cl. | H01g 9/22 |
| [50] | Field of Search | 317/230, 231; 136/86; 320/48 |

[56] References Cited
UNITED STATES PATENTS

| 2,702,272 | 2/1955 | Kasper | 317/231X |
|---|---|---|---|
| 3,196,048 | 7/1965 | Shropshire et al. | 136/86 |
| 3,302,091 | 1/1967 | Henderson | 320/48 |
| 3,463,673 | 8/1969 | Stroup | 320/48 |

*Primary Examiner*—James D. Kallam
*Attorneys*—Richard R. Brainard, Charles T. Watts, Paul A. Frank, Paul R. Webb, II, Joseph B. Forman, Frank L. Neuhauser and Oscar B. Waddell ABSTRACT: An electrochemical cell employs a redox couple in a solution in two separate chamber portions separated by an ion exchange membrane. A chemically inert electrode is positioned in each chamber portion in contact with the electrolytic solution. This cell operates with only an electron exchange between the oxidized and reduced form of a soluble ion upon current passage as opposed to the deposition and dissolution of a material during the operation of the device. This cell operates as a coulometer or as a very accurate, reproducible timing device upon the application of a predetermined current thereto.

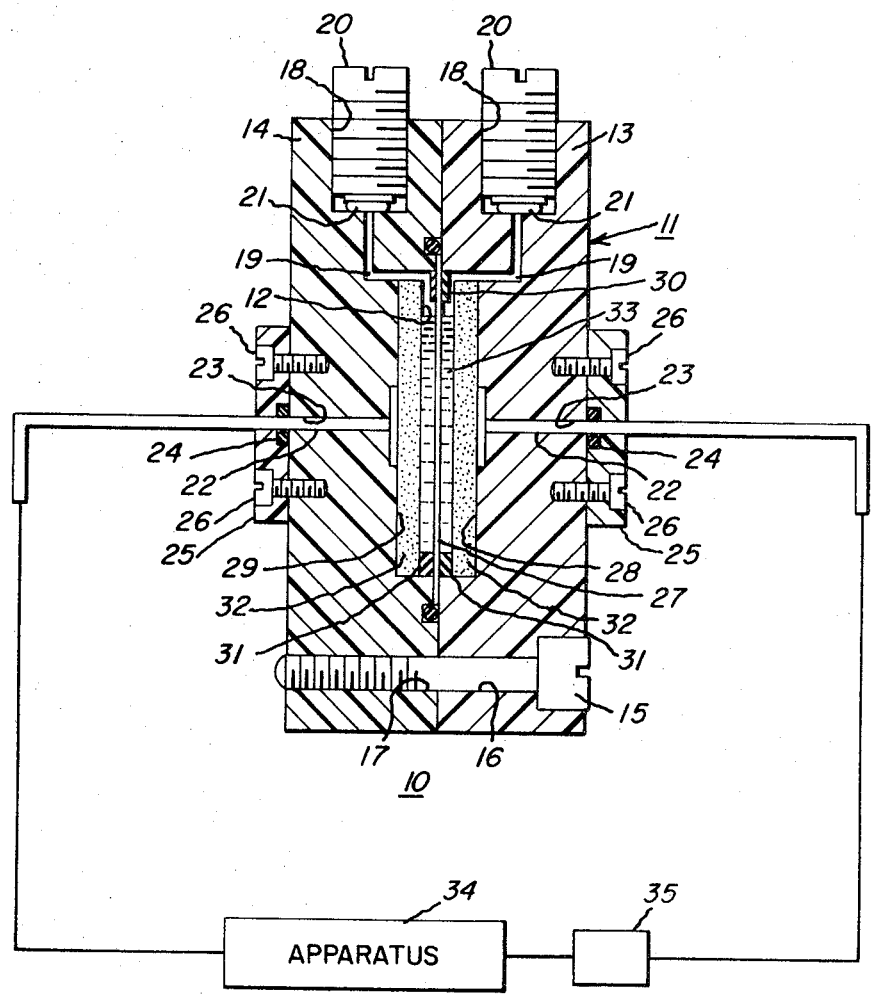

ELECTROCHEMICAL CELL WITH ELECTRON EXCHANGE MEMBRANE BETWEEN SOLUTIONS IN COMPARTMENTS

This application is a continuation-in-part of our copending application, Ser. No. 748,508, filed Jul. 29, 1968, which is assigned to the same assignee as the present application and which has become abandoned.

This invention relates to electrochemical cells and, more particularly, to electrochemical cells employing a redox couple in a solution.

An electrochemical cell which measures accurately the quantity of electricity which flows through a circuit is known as a coulometer. In a silver coulometer, the charge to be measured flows through the equivalent of a small silver-plating bath in series in the circuit, and the mass of silver dissolved or deposited is accurately determined. For example, a pair of silver electrodes are immersed in a solution of silver nitrate. The charge that flows in the circuit is readily computed since 1 faraday (96,522 coulombs) deposits 1 equivalent (107.91 grams) of silver.

In U.S. Pat. No. 3,302,091 issued Jan. 31, 1967, there is described a coulometric device wherein an electrochemical cell contains two sintered nickel plaques impregnated with cadmium and cadmium hydroxide, respectively, which are not in contact with one another but are connected to an external electrical circuit. An electrolyte, such as potassium hydroxide, is contained within the cell. In this device, a predetermined amount of cadmium is provided for one of the sintered nickel plaques to control the period of time during which a specific current will flow therethrough. This device is described as having particular application in the charging of secondary batteries.

However, for applications requiring extremely long life and reliability, the above type of device is unsuitable because the repeated cycling of the sintered nickel plaques is accompanied by noticeable evolution of gases due to the electrolysis of the solvent water. Additionally, the operation of the above type of cell involves chemical transformation in the solid state of the electroactive material, for example, the interconversion of cadmium and cadmium hydroxide.

The present invention is directed to an electrochemical cell which operates as a redox coulometer or as a timing device. The present cell eliminates the previous problems of hydrogen or oxygen gas evolution, and the predetermining and depositing of specific amounts of particular materials during cell reaction.

It is a primary object of our invention to provide a novel electrochemical cell which provides an electron exchange or charge transfer between an ion and an inert electrode upon current passage thereby eliminating the problems of deposition and dissolution of material and gas evolution in such a cell.

It is a further object of our invention to provide a novel electrochemical cell which operates as a coulometer or as a very accurate, reproducible timing device.

In accordance with one aspect of our invention, an electrochemical cell comprises a container defining a chamber, an ion exchange membrane positioned in the chamber and dividing the chamber into two portions, an electrolytic solution containing a redox couple in each chamber portion, a chemically inert electrode positioned in each chamber portion and in contact with the electrolytic solution, and an electrically conductive lead in contact with each of the electrodes.

These and various other objects, features and advantages of the invention will be better understood from the following description taken in connection with the accompanying drawing in which:

The single figure is a sectional view of a redox coulometer embodying out invention.

In the single figure of the drawing, there is shown generally at 10 an electrochemical cell embodying our invention. Cell 10 comprises a vessel or container 11 defining a chamber 12. The vessel 11 is preferably made of a nonconductive material such as polymethyl methacrylate, glass or other plastic material. Casing 11 is comprised of two substantially similar body portions 13 and 14 which are held together by a plurality of nylon screws 15 which are associated with an aperture 16 in portion 13 and a threaded aperture 17 in portion 14.

A small filling chamber 18 is provided in the upper end of each body portion 13 and 14 which chamber communicates through a conduit 19 to chamber 12. An end plug 20 with an O-ring 21 at its lower end is fitted into each of the respective chambers 18 to close these chambers and to prevent thereby evaporation of the solvent in chamber 12. A platinum electrode 22 extends from chamber 12 through an associated aperture 23 in each of the portions 13 and 14 to the exterior of the coulometer 10 for connection to an electrical circuit (not shown).

An O-ring 24 is fitted over the outer end of each of these electrodes and is held in position against the outside of each body portion 13 and 14 by an associated end cap 25. Each of these end caps 25 is held tightly against the outside of the respective body portions 13 and 14 by nylon plastic screws 26 which fit into aligned apertures in the end cap and in the exterior surfaces of each of the body portions.

Within chamber 12, there is provided an ion exchange membrane 27 which divides chamber 12 into chamber portions 28 and 29. A Teflon plastic ring 30 with a plurality of spacers 31 is positioned against each of the opposite surfaces of membrane 27. An inert electrode 32 is positioned on each side of the Teflon ring 30 whereby each electrode is in contact with its associated platinum current collector 23. Electrolytic solution 33 is contained between opposite sides of membrane 27 and associated electrode 32. Cell 10 is shown connected in series by means of leads 23 with apparatus 34 to be controlled thereby. Such apparatus might be, for example, a refrigerator defrost mechanism. A current source 35 provides electrical current to operate the cell as a coulometer or as a timing device. It will, of course, be appreciated that other sources of current and other types of apparatus can be employed and that the current source can be incorporated into the apparatus to be controlled. When a constant current is supplied to the cell, it functions as a timing device. When a variable current is supplied to the cell, it functions as a coulometer.

We discovered unexpectedly that we could form a unique electrochemical cell, which functioned as a coulometer or as a timing device wherein there was only an electron exchange between the oxidized and reduced form of a soluble ion upon current passage as opposed to the deposition of a material during the operation of the device. We found that such an electrochemical cell could be formed by a container defining a chamber with an ion exchange membrane in the chamber to divide the chamber into two portions, and a chemically inert electrode in each chamber portion, an electrolytic solution containing a redox couple in each of the chamber portions, and an electrically conductive lead in contact with each of the electrodes. The electrolytic solution can be an aqueous or nonaqueous solvent.

We found further that we could employ preferably electrodes of impervious carbon, graphite or pyrolytic graphite. We found further that while various redox couples could be employed, we prefer to use a redox couple of ferricyanide-ferrocyanide and a cation exchange membrane, such as a commercially available sulfonated polystyrene membrane. Additionally, ferrous and ferric ions form complexes with the anions of oxalic acid, picric acid, tartaric acid, ethylene diamine tetraacetic acid, etc. However, these couples would have a lower equilibrium potential than the ferricyanide-ferrocyanide couple.

When a ferricyanide-ferrocyanide couple is used, chemical stability requires a pH above 3.5, and preferably near 7. With this redox couple buffering can be accomplished by an aqueous phosphate electrolyte of a mixture of 0.5 M $KH_2PO_4$ + 0.5 M $Na_2HPO_4$ which results in an electrolyte with a pH of 6.67. When the required capacity of the coulometer is small, requiring only a small amount of redox electrolyte, the buffer can also function as a supporting electrolyte.

In an illustrative operation of above-described cell 10 shown in the single FIG. of the drawing, the cell is placed in series with apparatus 34 including a circuit to be timed. Current source 35 supplies electrical current to cell 10 for its operation. The cell employs a redox couple of ferricyanide-ferrocyanide, which is soluble in both its oxidized form and reduced form. For example, the ferricyanide-ferrocyanide couple is reversibly oxidized and reduced $$Fe(CN)_6^{-4} \rightleftharpoons Fe(CN)_6^{-3} + e$$

at an inert electrode with high exchange current density. The couple is chemically stable at the appropriate pH of 3.5 to 7 and has a potential far removed from that required for either the evolution of hydrogen or oxygen from water, which gas evolution poses problems with previous types of coulometers.

The cell consisting of two chamber portions each containing an inert electrode of pyrolytic graphite and each chamber portion filled with a composition of ferricyanide-ferrocyanide in an aqueous potassium supporting electrolyte, which composition is designated for this description as $C_O/D_R$ where C stands for concentration, O for oxidized species, and R for reduced species. In effect, this cell is a concentration cell with transference, which implies that there is electrolytic continuity from one chamber portion to the other. The potential of the cell is given by the Nernst relation $$E = \frac{RT}{nF} \cdot \ln \frac{C_O^{28} \cdot C_R^{29}}{C_R^{28} \cdot C_O^{29}}$$

where the numerals 28 and 29 stand for the respective chamber portions shown in the drawing.

As the ratios $C_O/C_R$ vary, so will the potential exhibited by the cell. This type of cell has particular application to regular repetitive timing or signaling wherein the external circuit will reverse the current flow at a given potential, starting a new half-cycle in the reverse direction.

Although the two chamber portions are in electrolytic continuity, the diffusion of the redox species from one to the other must be prevented. This is accomplished by the ion exchange membrane. Such a membrane is a cation exchange membrane when the changing concentrations involve anions as in this cell. Similarly, an anion exchange membrane should be used for electroactive cations, e.g., the exchange of ferrous-ferric ions.

Either the reduced or the oxidized species of the redox couple may be in limited supply. Its disappearance results in large changes of cell potential and hence triggers the external circuit. The mechanism of the coulometer is shown below in Table I wherein the concentrations of the redox species are set forth in arbitrary units.

TABLE I.—CONCENTRATION OF REDOX SPECIES

|  | Initial (On Filling) Chamber Portion | | Reset (Start of Timing) Chamber Portion | | Timing (Completion of Timing) Chamber Portion | |
|---|---|---|---|---|---|---|
|  | 28 | 29 | 28 | 29 | 28 | 29 |
| Species: | | | | | | |
| $C_O$ | 4 | 4 | 5 | 3 | 3 | 5 |
| $C_R$ | 1 | 1 | 0 | 2 | 2 | 0 |

In the above Table I, chamber portions 28 and 29 are filled with the same solution having a concentration ratio $C_O/C_R$ of 4/1. If a full cycle is divided into half-cycles, then the reduced species is oxidized at the positive electrode 28 on the first half-cycle, which is the charging or reset half-cycle. A corresponding amount of the reduced species, while it may be still in limited supply, is produced at the cathode chamber portion 29. In the following half-cycle, which is the discharge or timing half-cycle, the polarity is reversed and therefore both the cathodic and anodic processes are reversed and continued in this manner. Alternately, the oxidized species with the concentration $D_O$ could be in limiting supply.

In the operation of the cells embodying our invention, the timing and reset half-cycles can be identical, or can be different by a variation of the current which is applied to the device during the respective cycles. While we preferred to employ a cycling of the coulometer between +0.3 volt and −0.3 volt, other cycling parameters can be employed by using a different redox couple or by varying the concentration of the redox couple.

Examples of cells made in accordance with our invention are set forth below:

EXAMPLE 1

An electrochemical cell was assembled generally as shown in the single FIG. of the drawing with a pyrolytic graphite electrode with a surface area of 5.1 cm.² positioned in each chamber portion. A space of 0.0254 cm. was provided between each electrode and the cation exchange membrane thereby defining a volume of 0.13 ml. for each chamber portion. A total volume of 0.26 ml. of redox solution was used which was equally divided into the two chamber portions. The redox solution consisted of 0.016 M $K_3Fe(CN)_6$ + 0.004 M $K_4Fe(CN)_6$ The buffer solution was 0.5 M $Na_2HPO_4$ + 0.5 M $KH_2PO_4$. The cation exchange membrane was a sulfonated polystyrene membrane.

A constant current flow of 67 microamperes was supplied to the cell. The cell voltage varied between +0.3 volts and −0.3 volts. These regular substantial changes in voltage or half-cycles occurred every 0.43 hours. The cell was cycled 1,000 times with the same regular substantial changes in voltage. The capacity of the cell was 28 μa-hr.

EXAMPLE 2

A cell was assembled as shown in the single FIG. of the drawing. A pyrolytic graphite electrode with a surface area of 0.32 cm.² was positioned in each chamber portion. A space was provided between each electrode and the cation membrane thereby defining a volume of 0.025 ml. for each chamber portion. The same supporting electrolyte was used but the concentration of the redox couple was 0.5 M ferrocyanide and 0.125 M ferricyanide. The cation exchange membrane was a sulfonated polystyrene membrane. A constant current of 200 microamperes was supplied to the cell which was cycled between +0.3 volt and −0.3 bolt for 600 cycles. A substantial change in voltage occurred every 0.43 hours. The capacity of the cell was 86 μa-hr.

While other modifications of the invention and variations thereof which may be employed within the scope of the invention have not been described, the invention is intended to include such as may be embraced within the following claims:

We claim:

1. An electrochemical cell comprising a container defining a chamber, an ion exchange membrane positioned in the chamber and dividing the chamber into two portions, an electrolytic solution containing a redox couple in each chamber portion, said membrane being impervious to the redox couple in the electrolytic solution, and a chemically inert electrode positioned in each chamber portion and in contact with the electrolytic solution, and an electrically conductive lead in contact with each of the electrodes.

2. In a cell as in claim 1, in which a current source is connected to the leads.

3. In a cell as in claim 1, in which each of the electrodes is pyrolytic graphite.

4. In a cell as in claim 1, in which the redox couple is ferricyanide-ferrocyanide.

5. In a cell as in claim 1, in which the container is a closed vessel.

UNITED STATES PATENT OFFICE
CERTIFICATE OF CORRECTION

Patent No. 3,549,957          Dated    December 22, 1970

Inventor(s) Joseph L. Weininger and William N. Carson, Jr.

It is certified that error appears in the above-identified patent and that said Letters Patent are hereby corrected as shown below:

Column 3, line 20, cancel "$C_0D_R$" and substitute $-C_0/($

Column 4, line 4, cancel "$D_0$" and substitute $-C_0-$

Signed and sealed this 30th day of March 1971.

(SEAL)
Attest:

EDWARD M. FLETCHER, JR.          WILLIAM E. SCHUYLER
Attesting Officer                Commissioner of Pat